(12) United States Patent
Yamamoto (10) Patent No.: US 10,782,881 B2
(45) Date of Patent: Sep. 22, 2020

(54) STORAGE DEVICE FOR NOT ALLOWING TO WRITE DATA BASED ON END OF LIFE OF A DISK DEVICE

(71) Applicant: BUFFALO INC., Nagoya-shi, Aichi (JP)

(72) Inventor: Yasuyuki Yamamoto, Nagoya (JP)

(73) Assignee: BUFFALO INC., Nagoya-Shi (JP)

( * ) Notice: Subject to any disclaimer, the term of this patent is extended or adjusted under 35 U.S.C. 154(b) by 34 days.

(21) Appl. No.: 16/236,836

(22) Filed: Dec. 31, 2018

(65) Prior Publication Data

US 2019/0220193 A1    Jul. 18, 2019

(30) Foreign Application Priority Data

Jan. 15, 2018    (JP) ................. 2018-004425

(51) Int. Cl.
    *G06F 3/00*        (2006.01)
    *G06F 3/06*        (2006.01)

(52) U.S. Cl.
    CPC .......... *G06F 3/0604* (2013.01); *G06F 3/0674* (2013.01); *G06F 3/0679* (2013.01)

(58) Field of Classification Search
    CPC ............................ G06F 3/0604; G06F 3/0679

USPC ....................................................... 711/154
See application file for complete search history.

(56) References Cited

U.S. PATENT DOCUMENTS

| | | | |
|---|---|---|---|
| 2003/0140193 A1* | 7/2003 | Acharya | ............... G06F 3/0601 |
| | | | 711/112 |
| 2014/0173268 A1 | 6/2014 | Hashimoto | |
| 2016/0011818 A1 | 1/2016 | Hashimoto et al. | |
| 2017/0115904 A1 | 1/2017 | Hashimoto | |
| 2017/0160968 A1 | 2/2017 | Hashimoto et al. | |
| 2018/0011649 A1 | 1/2018 | Hashimoto et al. | |

FOREIGN PATENT DOCUMENTS

| | | | |
|---|---|---|---|
| JP | 2013-047913 A | | 3/2013 |
| JP | 2014-182503 A | | 9/2014 |
| JP | 2016-157470 A | | 9/2016 |

* cited by examiner

*Primary Examiner* — Jae U Yu
(74) *Attorney, Agent, or Firm* — XSENSUS LLP (57) ABSTRACT

A storage device includes: N (N is an integer of 2 or more) disk devices that records data redundantly, the N disk devices including NAND devices; and processing circuitry that checks a timing of reaching an EOL (End Of Life) for each of the N disk devices; and makes a setting that does not allow to write data into a disk device of the N disk devices for which a predetermined timing before the timing of reaching the EOL has arrived.

15 Claims, 3 Drawing Sheets

| TARGET CONDITION (X) | INFORMATION TO BE REFERRED TO (Y) | PARAMETER (Z) |
|---|---|---|
| aaaa | bbbb | cccc |
| dddd | eeee | ffff |
| ⋮ | ⋮ | ⋮ |

FIG. 4

STORAGE DEVICE FOR NOT ALLOWING TO WRITE DATA BASED ON END OF LIFE OF A DISK DEVICE

CROSS-REFERENCE TO RELATED APPLICATION

This application is based on and claims priority under 35 USC 119 from Japanese Patent Application No. 2018-004425 filed on Jan. 15, 2018, the contents of which are incorporated herein by reference.

TECHNICAL FIELD

The disclosure relates to a storage device and a recording medium.

BACKGROUND

A non-volatile storage device using a NAND device such as a solid state drive (SSD) has a previously assumed EOL (End Of Life). Japanese Patent Application Laid-Open Publication No. 2013-47913 discloses a technique of controlling the non-volatile storage device not to perform a write operation when the non-volatile storage device has little time before its EOL.

In the technique disclosed in Japanese Patent Application Laid-Open Publication No. 2013-47913, when it is determined that the non-volatile storage device has little time before its EOL, the boot loader is rewritten so that an emergency OS that does not perform an unintended write operation is to be booted, thereby suppressing the write operation.

On the other hand, when a plurality of non-volatile storage devices are used to construct a storage device (for example, a RAID (Redundant Arrays of Inexpensive Disks) device) for redundantly recording data, when one of the disk devices constituting the storage device is regarded to have reached its EOL and transits to a write inhibition mode (write protect mode), a disk device group including the disk device is treated as an error drive by the RAID controller even though data can be read from the disk device. Therefore, in practice, it may be impossible to read data from a disk device group configured as a RAID, even though redundancy can be secured.

SUMMARY

A storage device related to one aspect of this disclosure includes: N disk devices configured to record data redundantly, N being an integer of 2 or more, the N disk devices including NAND devices; and processing circuitry configured to check a timing of reaching an EOL (End Of Life) for each of the N disk devices; and make a setting that does not allow to write data into a disk device of the N disk devices for which a predetermined timing before the timing of reaching the EOL has arrived.

BRIEF DESCRIPTION OF DRAWINGS

Exemplary embodiments of the present disclosure will be described in detail based on the following figures, wherein.

DETAILED DESCRIPTION

The present disclosure has been made in view of the above circumstances, and provides a storage device, a storage system, and a program that can secure a data reading opportunity in a storage device including a plurality of disk devices configured using one or more NAND devices.

Figure 1:
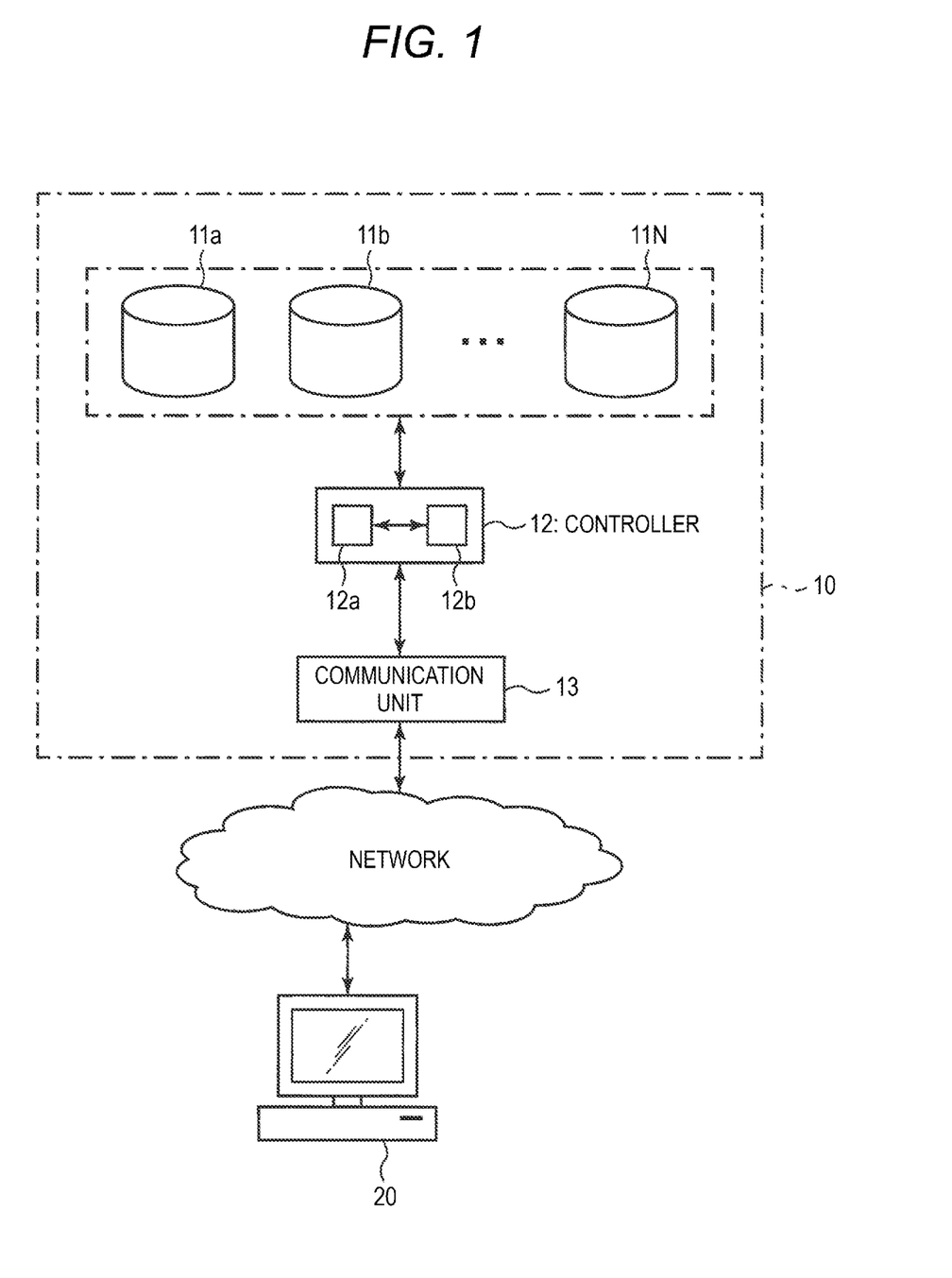
FIG. 1 is a configuration block diagram depicting an example of a storage system related to embodiments of the present disclosure.

Embodiments of the present disclosure will be described with reference to the drawings. As illustrated in FIG. 1, a storage system 1 related to embodiments of the present disclosure includes a storage device 10 and a host apparatus 20 connected to the storage device 10.

The storage device 10 includes a plurality of disk devices 11a, 11b, ..., 11N (N is an integer of 2 or more. Hereinafter, referred to as a disk device 11 if it is not needed to distinguish each) configured using NAND devices, a controller 12, and a communication unit 13.

The disk device 11 is a disk device configured using a NAND device, and is, for example, an SSD. The disk device 11 determines whether the disk device 11 has reached its EOL, and if it is determined that the disk device 11 has reached its EOL, the disk device 11 shifts to a "write protect mode" in which writing of data is not allowed.

In addition, the disk device 11 records status information related to its own operation. The status information includes, for example, a total number of bad blocks, a total number of times of reading, writing or erasing, an average number of times of reading, writing or erasing per unit time, a total number of times of occurrence of write errors in a NAND memory, a total number of times of occurrence of erase errors in a NAND memory, a total number of read logical sectors, a total number of written logical sectors, a total number of times of failure in ECC correction, a total number of n-m bits ECC correction units, a total number of times of occurrence of R errors in SATA communication, a total number of times of occurrence of errors in SATA communication, a total number of times of occurrence of memory errors in the disk device 11, a total usage time, a total time during which temperature is higher than the highest value of recommended operation temperature, a total time during which temperature is lower than the lowest value of the recommended operation temperature, a past maximum value of a response time for a command, an average value of a response time of a command, and a maximum value of a response time of a NAND memory, an average of a response time of a NAND memory, current temperature, the highest temperature during operation, and the lowest temperature during operation.

The controller 12 is a microcomputer or the like, and includes a program control device such as a CPU and a memory storing a program executed by the program control device. Here, the program may be stored in a computer-readable and non-transitory recording medium or received via a network, and may be stored in a memory of the controller 12.

In one example of the present embodiments, the controller 12 includes a basic function unit 12a and a limitation setting unit 12b. Here, the basic function unit 12a functions as a conventional general RAID controller. The basic function unit 12a and the limitation setting unit 12b may be implemented by a processor such as a single CPU, or may be implemented by a plurality of processors, such as a CPU or the like different from each other.

In an example of the present embodiments, the controller 12 may be implemented by a processor of the host apparatus 20 executing a RAID controller program. That is, the RAID configuration in the present embodiments may be implemented as hardware RAID or as software RAID.

Specifically, the basic function unit 12a of the controller 12 identifies each of the plurality of disk devices 11 with device identification information set by a predetermined method. The basic function unit 12a of the controller 12 may set a drive identifier in advance for each drive bay to which the disk device 11 is connected, and may use the drive identifier as device identification information for identifying the disk device 11 connected to the corresponding drive bay.

The basic function unit 12a of the controller 12 uses the plurality of disk devices 11 identified by the device specifying information to redundantly record data to be recorded, which is received via the communication unit 13. Since this redundant recording method is a widely known method such as RAID, a detailed description is omitted here. A configuration of a so-called RAID 5 may be used, and two RAID groups may be configured using N/2 (where N is an even number of 4 or more), for example. In the latter case, the host apparatus 20 recognizes that the storage device 10 has two disk devices. In the following description, each of the redundant configuration recording units (group of disk devices 11 recognized as one disk device) such as RAID is referred to as a disk array.

Upon receiving the read command, the basic function unit 12a of the controller 12 outputs data recorded in a position in the disk device 11 specified by a read command to the communication unit 13 and sends the data to the host apparatus 20. Since the operation of the basic function unit 12a of the controller 12 up to this point is an operation in a typical storage device configured as RAID, further detailed description is omitted.

In the present embodiments, when receiving a write command of data, the basic function unit 12a of the controller 12 checks whether or not data writing to a disk array designated by the write command as a data write destination is not permitted. The basic function unit 12a of the controller 12 writes data to the disk array in accordance with the write command of the received data unless the data writing to the disk array designated as the data write destination is not permitted. Since this data writing processing is the same as in the related art, further detailed description thereof is omitted.

On the other hand, the basic function unit 12a of the controller 12 does not write data when data writing to a disk array designated by a write command of the received data as a data write destination is not permitted. At this time, the basic function unit 12a may send an error notification representing that writing cannot be performed to the host apparatus 20 side which is the transmission source of the write command.

Also in the present embodiments, the limitation setting unit 12b of the controller 12 makes, for a disk device 11 for which a predetermined timing before the timing of reaching the EOL of the disk device 11 has arrived (for example, a timing at which the disk device 11 transits to the write protect mode), at least a setting that does not permit data writing to the disk device 11 (or a setting that does not permit data writing to the disk array including the disk device 11) when at least a predetermined condition is satisfied. Hereinafter, the timing of reaching the EOL is referred to as an EOL reach timing.

Here, the predetermined condition is, for example, a condition that redundancy cannot be secured in a disk array including the disk device 11 when the disk device 11 in the predetermined timing transits to the write protect mode.

Specifically, the limitation setting unit 12b of the controller 12 checks, for each disk array, whether or not there is a disk device 11 for which writing is not allowed or a disk device 11 in a failure state among the disk devices 11 constituting the disk array.

Here, the failure state includes a state in which writing is impossible in reality, and a state in which the disk device 11 is in the write protect mode by determining by itself that the disk device 11 has reached the EOL.

The limitation setting unit 12b of the controller 12 further determines whether or not redundancy cannot be secured for a disk array if another disk device 11 in the disk array fell into a failure state, when a disk device 11 included in the disk array falls into a failure state. When it is determined that the redundancy cannot be secured if another disk device 11 in the disk array fell into a failure state, the controller 12 performs the following processing. Specifically, if there is a disk device 11 that is included in the disk array and is in the predetermined timing before an estimated EOL reach timing, the controller 12 makes a setting that does not permit data writing to that disk device 11. An example of operation of the limitation setting unit 12b of the controller 12 will be described later.

The communication unit 13 is a network interface, a serial interface, or the like, and transmits and receives data and the like to and from the host apparatus 20 via a serial connection unit such as a network or a USB. When receiving recording target data together with a data recording command (write command) from the host apparatus 20, the communication unit 13 outputs the recording target data to the controller 12. Upon receiving a data reading command (read command) from the host apparatus 20, the read command is outputted to the controller 12, and data output from the controller 12 in response to the read command is transmitted to the host apparatus 20.

The host apparatus 20 is, for example, a personal computer (PC) or the like, and transmits the recording target data and the data recording command to the storage device 10 in response to an instruction from a user. In response to an instruction from a user or the like, the host apparatus 20 sends a data reading command to the storage device 10, receives data to be transmitted in response to a read command of the data, and provides the received data to predetermined processing, for example, processing designated from the user by using the data.

Figure 2:
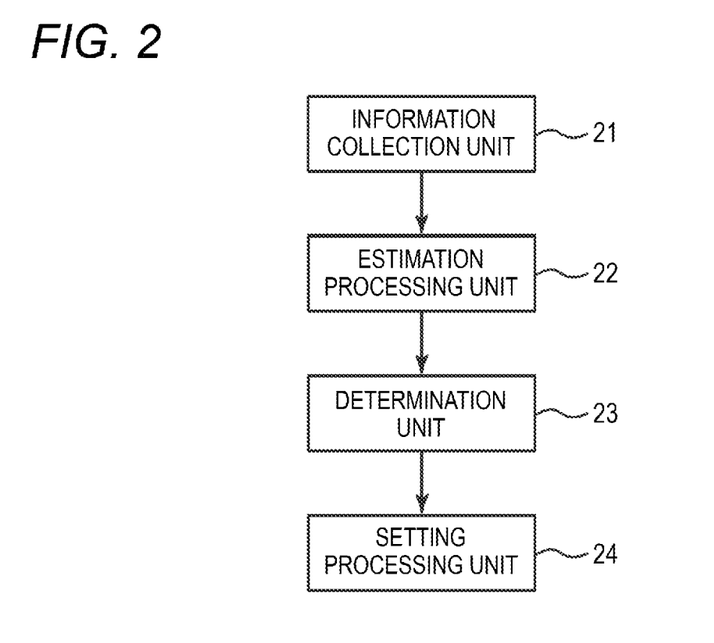
FIG. 2 is a functional block diagram of an example of a storage device related to embodiments of the present disclosure.

Next, operation of the controller 12 of the storage device 10 (particularly, operation of the limitation setting unit 12b) will be described. In the present embodiments, the controller 12 functions as the limitation setting unit 12b by executing a program stored in a memory. As illustrated in FIG. 2 as an example, the controller 12 functionally includes an information collection unit 21, an estimation processing unit 22, a determination unit 23, and a setting processing unit 24.

The information collection unit 21 collects information for estimating the EOL reach timing of each disk device 11. In one example of the present embodiments, the information collection unit 21 collects status information related to the operation of the disk device 11. The status information includes, for example, at least one of a total number of bad blocks, a total number of times of writing, an average number of times of reading per unit time, a total number of times of erasing, an average number of times of erasing per unit time, a total number of times of occurrence of write errors in a NAND memory, a total number of times of occurrence of erase errors in a NAND memory, a total number of read logical sectors, a total number of written logical sectors, a total number of times of failure in ECC correction, a total number of n-m bits ECC correction units, a total number of times of occurrence of R errors in SATA communication, a total number of times of occurrence of errors in SATA communication, a total number of times of occurrence of memory errors in the disk device 11, a total usage time, a total time during which temperature is higher than the highest value of recommended operation temperature, a total time during which temperature is lower than the lowest value of the recommended operation temperature, a past maximum value of a response time for a command, an average value of a response time of a command, and a maximum value of a response time of a NAND memory, an average of a response time of a NAND memory, current temperature, the highest temperature during operation, the lowest temperature during operation, an increment ratio of a number of statistical information set recorded by the disk device 11 per unit time, and a NAND arrangement failure flag. Furthermore, the information collection unit 21 may collect information for the EOL (referred to as ensured EOL information) preset for the disk device 11 (ensured by a manufacturer of the disk device 11). The information for the EOL includes a total number of times of erasing and/or a total usage time, for example.

The estimation processing unit 22 estimates the EOL reach timing for each of the disk devices 11 based on the status information collected by the information collection unit 21. Unlike the ensured EOL information for the disk device 11, the EOL reach timing is, for example, a timing before a timing determined as the EOL (hereinafter, this timing is referred to as "manufacturer setting EOL timing"), such as a timing when the number of bad blocks exceeds a threshold value determined by the manufacturer.

As an example, the estimation processing unit 22 of the present embodiments refers to the number of bad blocks and the number of times of erasing in the status information of each disk device 11, and estimates the EOL reach timing for the disk device 11 by using a value obtained by subtracting the number of bad blocks BB from a predetermined threshold value TH. As a specific example, the estimation processing unit 22 obtains a value $\alpha*(TH-BB)$ by multiplying a value obtained by subtracting the number of bad blocks BB from a predetermined threshold value TH by a predetermined positive constant $\alpha$. Then, the estimation processing unit 22 estimates the value $ENc+\alpha*(TH-BB)$ by adding the number of erasures ENc at the time of estimation to this value as the EOL reach timing.

The threshold value TH and the constant $\alpha$ are set such that the estimated EOL reach timing is before the manufacturer setting EOL timing. For example, assuming that the manufacturer setting EOL timing is a value of BBlimit by totaling number of times of erasing, the controller 12 sets the threshold value TH so as to satisfy a condition TH<BBlimit. Specifically, TH="1" (the EOL reach timing may be estimated when a bad block occurred), or may be a predetermined integer value that is "2" or more and less than BBlimit.

When the number of bad blocks is used to estimate the EOL reach timing, a method of estimating the EOL reach timing by subtracting the number of bad blocks from the threshold value is an example. This estimation may be performed using a ratio of a threshold value and the number of bad blocks, such as $\alpha*(1-BB/TH)$, or another arithmetic expression may be used.

For example, when information of the remaining lifespan can be acquired from the disk device 11, a timing at which the remaining lifespan goes below a predetermined threshold value may be used as the EOL reach timing (in this case, a timing for preventing the EOL (hereinafter, referred to as a EOL prevention timing) described later is defined as a value equal to or greater than a value of the information of remaining lifespan corresponding to the EOL reach timing). Further, the number of unused sectors prepared for relocation (this decreases as the number of bad blocks increases) may be set as the EOL reach timing (in this case, the EOL prevention timing described later is defined as a value equal to or larger than the number of unused sectors prepared for relocation, which corresponds to the EOL reach timing).

Further, in an example here, the estimation processing unit 22 sets the EOL reach timing to a timing after the timing indicated by the ensured EOL information determined by the manufacturer. However, the estimation processing unit 22 may set the timing indicated by the ensured EOL information as the EOL reach timing without substantially performing the estimation processing. When the disk device 11 has a function of notifying of entering the write protect mode before the disk device 11 enters the write protect mode (or the remaining period until entering the write protect mode), the timing at which the notification is received may be set as the EOL reach timing.

The determination unit 23 determines whether or not there is a disk device for which a predetermined timing before the EOL reach timing has arrived (namely, the EOL prevention timing) determined by the estimation processing unit 22. Here, the predetermined timing before the EOL reach timing (the EOL prevention timing) is set as a value $\tau=T-ENs$ obtained by subtracting the predetermined erase count ENs from the EOL reach timing $T=ENc+\alpha*(TH-BB)$. The EOL prevention timing may be the EOL reach timing itself (ENs=0 in the above example).

The determination unit 23 obtains a value $\tau i=Ti-ENs$ by subtracting a predetermined erase count ENs, which is determined by the estimation processing unit 22, from each of the EOL reach timings Ti (i=1, 2) of each of the disk devices 11, and compares it with the current erase count ENi of the corresponding disk device 11. Then, the determination unit 23 checks whether or not the current erase count ENi exceeds the value $\tau i$ obtained by the aforementioned method. If there is a disk device 11 in which ENi>$\tau i$ (if there is a disk device 11 for which the EOL prevention timing has arrived), the determination unit 23 determines whether or not redundant recording by the plurality of disk devices 11 including the disk device 11 for which the EOL prevention timing has arrived (namely, the disk drive 11 that is at or after the EOL prevention timing) is disabled.

Here, whether or not the redundant recording is disabled is determined based on whether or not recorded data cannot be read (at least a part of the data cannot be read) when another disk device 11 (for example, the disk device 11 whose lifetime prevention timing has arrived) has fallen into a failure state.

The storage device 10 may include N (N is an integer of 4 or more) disk devices 11. And a first virtual disk (a first disk array) may be configured by using m (1<m<N) disk devices of the N disk devices 11, and a second virtual disk (a second disk array) may be configured by using p (1<p<N−m) disk devices that are different from disk devices in the first virtual disk respectively. In this way, when a plurality of disk arrays are configured, the determination unit 23 determines whether or not redundant recording is disabled for a disk array including the disk devices 11 for which the EOL prevention timing has arrived (whether data reading is impossible or not if the disk device 11 for which the EOL prevention timing has arrived had fallen into a failure state next).

When the determination unit 23 determines that the redundant recording is disabled, the setting processing unit 24 does not permit data writing to the disk device 11 for which the EOL prevention timing has arrived.

In a case where the determination unit 23 determines whether or not a redundant recording is disabled for each disk array, the setting processing unit 24 does not permit data writing to the disk device 11 for which the EOL prevention timing has arrived, which is included in the disk array determined to be unable to record redundantly.

The setting that the writing of data is not permitted may be implemented by control in the basic function unit 12a of the controller 12, or by control in the basic function unit 12a and mounting the disk device 11 in a state in which only reading is permitted (so-called RO mounting is performed) for the host apparatus 20. In another example, the disk array including the disk device 11 for which the writing of the data is not permitted may be mounted in a state in which only reading is permitted to the host apparatus 20.

In an example of the present embodiments, the controller 12 may not determine the EOL reach timing and the EOL prevention timing for all of the disk devices 11 included in the storage device 10, but may perform the aforementioned processing by determining the EOL reach timing and the EOL prevention timing of the disk device 11 satisfying a predetermined target condition.

Figure 3:
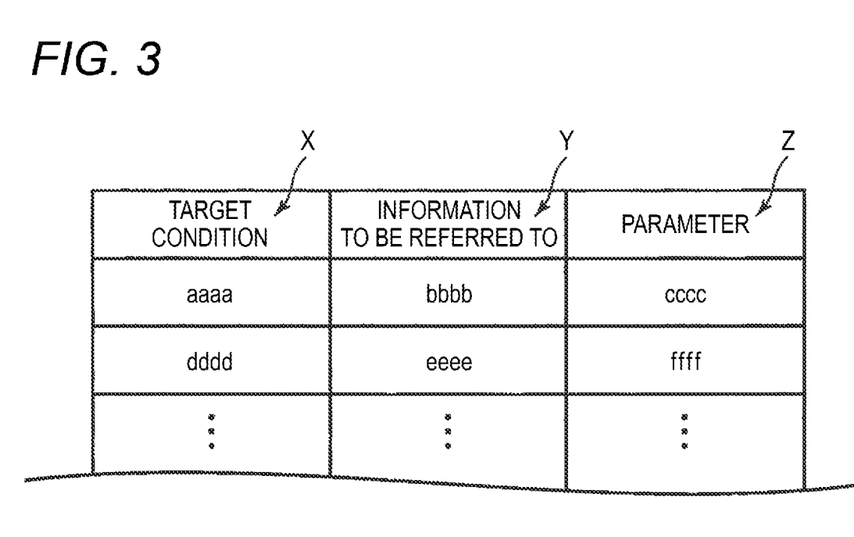
FIG. 3 is an explanatory diagram depicting an example of content of information related to a timing of reaching the EOL, which is held by the storage device related to embodiments of the present disclosure.

As an example, the target condition may be determined based on a model number (information specifying a manufacturer or a model, information specifying a manufacturing lot, or the like) of the disk device 11. Further, for each of the target conditions, information to be referred to in order to estimate the EOL arrival timing, a threshold value TH, a value for determining the EOL prevention timing (difference in the number of times of erasing from the EOL reach timing, or the like) may be different. In this case, the controller 12 may be an accessible storage (or a memory in the controller 12 or an external memory). And, as illustrated in FIG. 3, the controller 12 may calculate the EOL reach timing and the EOL prevention timing with reference to the target condition (X) such as information on the model number of the disk device 11, information (Y) identifying a type of information to be referred to, and parameter information (Z) for determining the EOL reach timing and the EOL prevention timing such as threshold values and the like which are associated with each other, and if necessary (when the disk device 11 satisfies the target condition).

The present embodiments have the above-described configuration, and operates as in the following example. In the following example, it is assumed that the storage device 10 includes four disk devices 11a, 11b, 11c, and 11d. In the storage device 10, a first virtual disk of RAID1 (mirroring) is configured using the disk devices 11a and 11b, and the second virtual disk of RAID1 is configured using the disk devices 11c and 11d. That is, in this example, it is assumed that the data written to the first virtual disk by the host apparatus 20 is redundantly recorded in both the disk devices 11a and 11b.

It is assumed that the controller 12 sets serial numbers from "1" to "4" as device identification information for each of the disk devices 11a, 11b, 11c, and 11d.

In addition, the controller 12 executes processing for estimating the EOL reach timing of each of the disk devices 11a, 11b, 11c, and 11d at a predetermined timing (for example, a timing at which some error occurs in the disk device 11, a regular timing, or the like).

Figure 4:
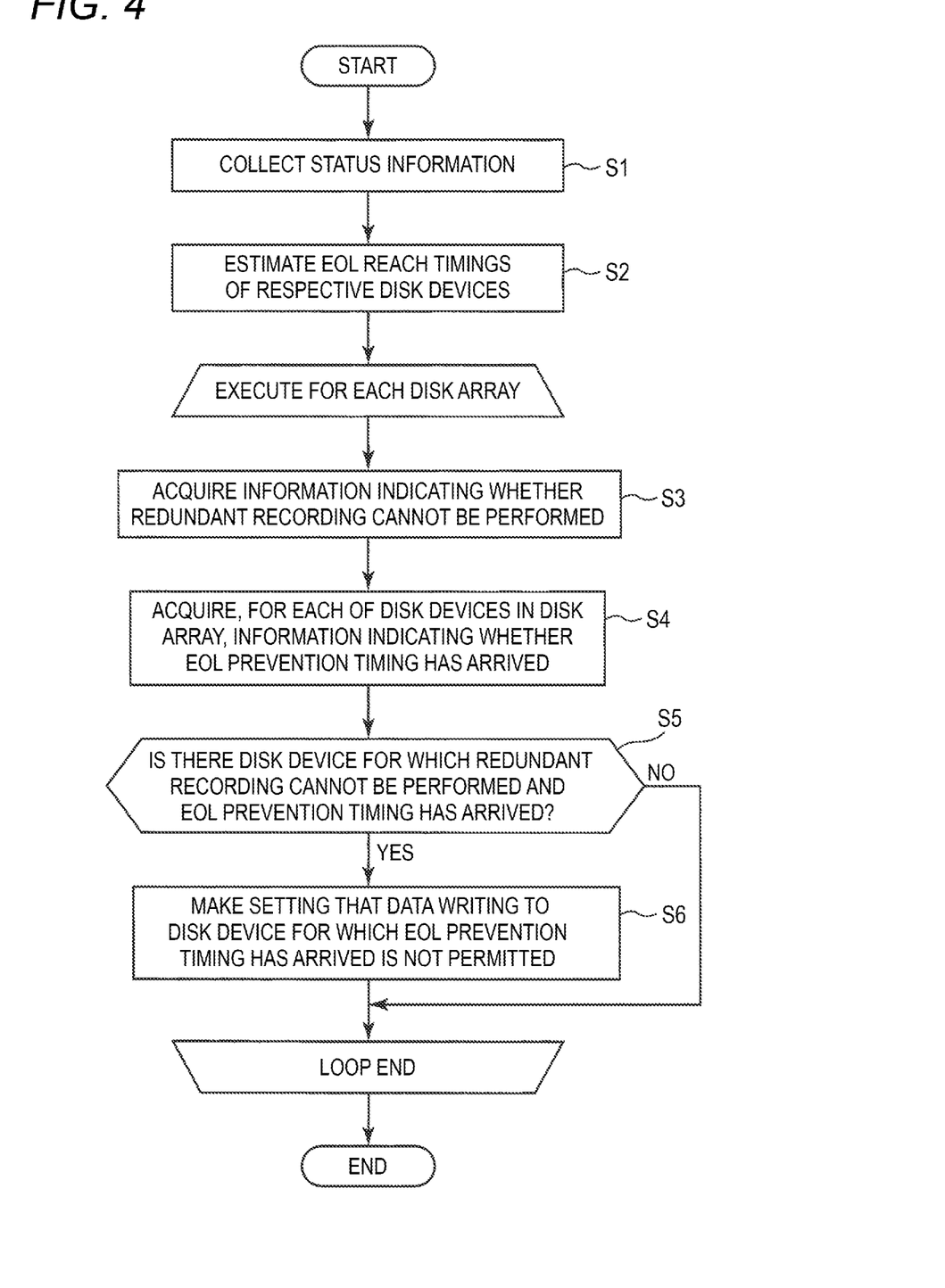
FIG. 4 is a flowchart representing an example of operation of the storage device related to embodiments of the present disclosure.

In this processing, as illustrated in FIG. 4, the controller 12 collects the total number of bad blocks and the total number of times of erasing as status information for estimating the EOL reach timing of each of the disk devices 11a, 11b, 11c, and 11d (S1).

The controller 12 estimates the EOL reach timings of the respective disk devices 11a, 11b, 11c, and 11d based on the acquired status information (S2). The controller 12 obtains, for each of the disk devices 11a, 11b, 11c, and 11d, for example, a value $\alpha^*(TH-BBi)$ by multiplying a value obtained by subtracting the referred number of bad blocks $BBi$ (where i is device identification information, and an integer that is one of 1 to 4, in this example) from a predetermined threshold value TH by a predetermined positive constant $\alpha$. The controller 12 estimates the EOL reach timing of the disk device 11 as $ENci+\alpha^*(TH-BBi)$ obtained adding the number of times of erasing $ENci$ at the time of the estimation processing of the corresponding disk device 11 to the obtained value $\alpha^*(TH-BBi)$.

Note that, as described above for the threshold TH and the constant $\alpha$, the controller 12 sets the threshold value TH so that the threshold value TH satisfies TH<BBlimit, when the manufacturer setting EOL timing is set to be the total number BBlimit of times of erasing so that the estimated EOL reach timing is before the manufacturer setting EOL timing.

The controller 12 stores, for each of the disk devices 11a, 11b, 11c, and 11d, the EOL reach timing estimated in the processing S2 for the corresponding disk device 11 in association with the device identification information specifying the disk device 11.

The controller 12 acquires information indicating whether or not a redundant recording cannot be performed for each virtual disk. In other words, the controller 12 acquires information indicating whether or not recorded data (at least part of data) is unable to be read when another disk device 11 of the disk devices 11 constituting the disk array as a virtual disk fails (at least a part of the data cannot be read) (S3).

The controller 12 further acquires information indicating whether or not the EOL prevention timing has arrived for the disk device 11 constituting the disk array (S4). In the processing of S4, a value $\tau i=Ti-ENs$ obtained by subtracting the predetermined erase count $ENs$ from each of the EOL reach timing $Ti=ENci+\alpha^*(TH-BBi)$ is obtained. And the controller 12 compares the obtained value $\tau i$ with the current (at the time of execution of the process S 11) erase count $ENi$ of the corresponding disk device 11.

It is assumed that the controller 12 regards the disk device 11 whose current erase count $ENi$ exceeds the value $\tau i$ obtained by the above-described method, that is, $ENi \geq \tau i$ as the disk device 11 that has reached the EOL prevention timing. When $ENi < \tau i$, the controller 12 determines the EOL prevention timing has not arrived for the disk device 11.

Based on the information obtained by the processing S3 and the processing S4, the controller 12 checks whether or not there is a disk device 11 for which the EOL prevention timing has arrived among the disk devices 11 in the disk array (disk array in which at least a part of the recorded data cannot be read) (S5).

When the controller 12 determines that there is the disk device 11 for which the EOL prevention timing has arrived among the disk devices 11 in the disk array in which the redundant recording cannot be performed (S5: Yes), the controller 12 makes a setting that data writing to the disk device 11 for which the EOL prevention timing has arrived is not permitted (S6).

In addition, in the processing S5, when there is no disk array in which redundant recording cannot be performed or when there is no disk device 11 for which the EOL prevention timing has arrived in the disk devices 11 of a disk array even though there is a disk array in which redundant recording cannot be performed (S5: No), the controller 12 continues the processing. In this case, any operation of reading and writing is permitted to the disk device 11 in the disk array.

When the controller 12 finds a disk array in which redundant recording cannot be performed in the processing of S3, the controller 12 may perform control so as to shift to a mode in which a disk device is replaced while performing normal recording (so-called a degraded mode). Since this mode transition processing is a widely known processing, detailed description thereof will be omitted.

The controller 12 repeatedly executes the processing of steps S3 to S6 for each virtual disk.

With this operation, when a disk array including a disk device 11 for which the EOL prevention timing has arrived falls into a state that redundant recording cannot be performed (when recorded data cannot be read out in a case where another disk device 11 falls into a failure state) or when one disk device 11 in a disk array in a state that redundant recording cannot be performed, the storage device 10 according to the present embodiments makes a setting that does not permit data writing to the disk device 11 for which the EOL prevention timing has arrived, and mounts the disk array in the write protect mode on the host apparatus 20.

That is, when the disk device 11 constituting the storage device 10 is determined that the disk device 11 has reached the EOL before transiting to the write protect mode and at least part of data cannot be read (redundant recording cannot be performed) in a case where the disk device 11 falls into a failure state (including a case where it is determined that the disk device 11 has reached the EOL and transits to the write protect mode), data writing to the disk device 11 for which the EOL reach timing has arrived is banned by a setting. As a result, the disk device 11 itself transits to the write protect mode, the disk array cannot be constructed, and data cannot be read out. In addition, since the disk device 11 transits, before the EOL, to a state where only data reading has been permitted, the opportunity of data loss can be reduced.

Further, in the example of the present embodiments, even in the disk device 11 in which data writing is not permitted, the controller 12 may make a setting that permits data writing to an area secured as a system area in the disk device 11 (an area that stores therein not user data but an operating system for emergency operation). In this case, when receiving an instruction to write data to the system area, the controller 12 executes data writing into the system area in accordance with the instruction. In addition, at this time, the controller 12 ignores the data write instruction for an area other than the system area, or performs processing as an error and does not write data.

Further, in the processing of S4, the controller 12 may perform notification processing indicating that such a disk device 11 is present when determining that a predetermined timing (EOL prevention timing) before the EOL reach timing has arrived for the disk device 11, regardless of whether or not data writing to the disk device 11 is permitted. This notification processing may be performed by, for example, displaying a character string for notifying the situation on a liquid crystal display (not shown) included in the storage device 10, by sounding a buzzer (not shown) provided in the storage device 10, or by outputting a notification indicating that the disk device 11 for which the EOL prevention timing has arrived exists.

Further, in this notification processing, a predetermined mail server may send a mail indicating that the disk device 11 that has reached the EOL prevention timing exists to a predetermined user. Further, in a case where the controller 12 functions as a web server, when information is requested from the host apparatus 20 or the like to the web server via the network, a web page for displaying information indicating that the disk device 11 that has reached the EOL prevention timing exists may be provided to the request source.

In this case, when the notification is received, the host apparatus 20 may perform display or the like of the notification to the user. Although it is not always necessary to specify the disk device 11 for which the EOL prevention timing has arrived exists, the controller 12 may also notify the device identification information of the disk device 11 for which the EOL prevention timing has arrived.

[iSCSI Connection]

In an example of the present embodiments, the host apparatus 20 may communicate with the storage device 10 based on the iSCSI (internet Small Computer System Interface) standard to instruct the storage device 10 to write or read data.

In this case, in the iSCSI standard, there is a case where mounting cannot be performed in a state in which writing of data is not permitted. Therefore, when there is the host apparatus 20 connected by communication based on the iSCSI standard (iSCSI protocol), the controller 12 of the storage device 10 checks, at the time of connection, whether or not there is the disk device 11 whose data writing is not permitted, and again makes a setting that allows data writing to the disk device 11 temporarily (during communication based on the iSCSI standard). When the communication based on the iSCSI standard is terminated, the controller 12 sets the disk device 11 that has been reset to permit data writing during communication based on the iSCSI standard, so as not to permit writing of data.

At this time, the controller 12 may transmit a notification indicating that the EOL is approaching or a notification requesting not to write data. As described above, these notifications can be achieved by various methods such as display using a liquid crystal display (not shown) included in the storage device 10, a method for notifying the host apparatus 20, and the like.

Moreover, in the description of the present embodiments, the SSD is described as an example of the device using the NAND device, but this is only an example, and an SD card or a USB memory using a NAND flash memory may be used. The processing related to the present disclosure may be applied to a case where redundant writing is performed using at least one of the aforementioned types of devices.

The present embodiments described above is summarized as follows.

A storage device related to one aspect of the present embodiments includes: N disk devices configured to record data redundantly, N being an integer of 2 or more, the N disk devices including NAND devices; and processing circuitry. The processing circuitry is configured to: check a timing of reaching an EOL (End Of Life) for each of the N disk devices; and make a setting that does not allow to write data into a disk device of the N disk devices for which a predetermined timing before the timing of reaching the EOL has arrived.

In this way, by making the setting that does not allow to write data into the disk device of the N disk devices for which the predetermined timing before the timing of reaching the EOL has arrived, it becomes possible to secure an opportunity to read data before a disk device included in disk devices for redundant recording, such as a RAID configuration, is treated as an error drive.

Moreover, the processing circuitry may further be configured to estimate the timing of reaching the EOL for each of the N disk devices, and make the setting that does not allow to write data into the disk device of the N disk devices for which the predetermined timing before the estimated timing of reaching the EOL has arrived.

In this way, by making the setting that does not allow to write data into the disk device for which the predetermined timing before the estimated timing of reaching the EOL has arrived, it becomes possible to secure an opportunity to read data before a disk device included in disk devices for redundant recording, such as a RAID configuration, is treated as an error drive.

Moreover, the processing circuitry may further be configured to determine whether or not redundant recording is disabled in a plurality of disk devices that includes the disk device of the N disk devices for which the predetermined timing before the timing of reaching the EOL has arrived.

Here, the processing circuitry may further be configured to make the setting that does not allow to write data into the disk of the N disk devices for which the predetermined timing before the timing of reaching the EOL has arrived, in response to determining that the redundant recording is disabled.

As a result, the data cannot be written in a state where redundant recording is enabled, and the disk device can be used as long as possible.

The processing circuitry may further be configured to configure one or a plurality of virtual disks using the N disk devices, and make the setting that does not allow to write data into a virtual disk of the one or the plurality of virtual disks, which includes the disk device for which the predetermined timing before the timing of reaching the EOL has arrived, in response to determining that the redundant recording is disabled.

The processing circuitry may further be configured to configure a first virtual disk using m (1<m<N) disk devices of the N (N is an integer that is equal to or more than 4) disk devices, and configure a second virtual disk using p (1<p<N−m) disk devices each of which is different from disk devices constituting the first virtual disk, and make the setting that does not allow to write data into the first or second virtual disk that includes the disk device for which the predetermined timing before the timing of reaching the EOL has arrived, in response to determining that the redundant recording is disabled.

This also makes it possible to prevent from transiting to a setting that does not allow to write data in a state where redundant recording is enabled, and the disk device can be used as long as possible.

The processing circuitry may further be configured to make a setting that allows to write data into the disk device in response to the storage device being connected through iSCSI (internet Small Computer System Interface), even when the setting that does not allow to write data is applied to one of disk devices. As a result, specific circumstances are reflected when connecting through iSCSI.

The processing circuitry may further be configured to make a setting that allows to write data into a system area, and does not allow to write data into areas other than the system area.

As a result, it is possible to keep data writing to the system area allowed and prevent errors in a system to occur.

The processing circuitry may further be configured to notify of the disk device for which the predetermined timing before the timing of reaching the EOL has arrived.

In this manner, a notification related to the disk device for which the predetermined timing before the timing of reaching the EOL has arrived is performed, thereby giving a user opportunities to handle.

The processing circuitry may further configured to determine whether each of the N disk devices satisfies a predetermined condition, and check the timing of reaching the EOL for each of the N disk devices when determining that each of the N disk devices satisfies the predetermined condition.

The predetermined condition may include at least one of a condition for a model of a disk device, a condition for a manufacturer of a disk device, and a condition for a manufacturing lot of a disk device.

The processing circuitry may further be configured to receive an instruction to read data and write data from a host device, when connecting to the host device through iSCSI.

A non-transitory computer-readable storage medium relates to one aspect of the present embodiments and stores therein a program for causing a computer to: check a timing of reaching an EOL (End Of Life) for each of a plurality of disk devices that are configured using NAND devices and in which data is recorded redundantly; and make a setting that does not allow to write data into a disk device for which a predetermined timing before the timing of reaching the EOL has arrived.

A method relating to one aspect of the present embodiments includes: checking, using processing circuitry, a timing of reaching an EOL (End Of Life) for each of a plurality of disk devices configured to record data redundantly, the plurality of disk devices including NAND devices; and making, using the processing circuitry, a setting that does not allow to write data into a disk device of the plurality of disk devices for which a predetermined timing before the timing of reaching the EOL has arrived.

The invention claimed is:

1. A storage device, comprising:
N disk devices configured to record data redundantly, N being an integer of 2 or more, the N disk devices including NAND devices; and
processing circuitry configured to
perform processing for configuring a virtual disk using a plurality of disk devices of the N disk devices;
check a timing of reaching an EOL (End Of Life) for each of the N disk devices;
determine whether redundant recording is disabled in the virtual disk;

determine whether the plurality of disk devices include a disk device for which a predetermined timing before the timing of reaching the EOL has arrived; and allow writing data into the virtual disk, when it is determined that the redundant recording is not disabled in the virtual disk and the plurality of disk devices include the disk device for which the predetermined timing before the timing of reaching the EOL has arrived.

2. The storage device according to claim 1, wherein the processing circuitry is further configured to:

estimate the timing of reaching the EOL for each of the N disk devices; and make a setting that does not allow to write data into a disk device of the N disk devices for which the predetermined timing before the estimated timing of reaching the EOL has arrived.

3. The storage device according to claim 1, wherein the processing circuitry is further configured to determine whether or not the redundant recording is disabled in the plurality of disk devices of the N disk devices that include the disk device for which the predetermined timing before the timing of reaching the EOL has arrived.

4. The storage device according to claim 3, wherein the processing circuitry is further configured to make a setting that does not allow to write data into the disk for which the predetermined timing before the timing of reaching the EOL has arrived, in response to determining that the redundant recording is disabled.

5. The storage device according to claim 3, wherein the processing circuitry is further configured to:

configure one or a plurality of virtual disks using the N disk devices, and make a setting that does not allow to write data into a virtual disk of the one or the plurality of virtual disks, which includes the disk device for which the predetermined timing before the timing of reaching the EOL has arrived, in response to determining that the redundant recording is disabled.

6. The storage device according to claim 3, wherein N is an integer that is equal to or more than 4, and the processing circuitry is further configured to:

configure a first virtual disk using m (1<m<N) disk devices of the N disk devices;

configure a second virtual disk using p (1<p<N−m) disk devices each of which is different from disk devices constituting the first virtual disk; and make the setting that does not allow to write data into the first or second virtual disk that includes the disk device for which the predetermined timing before the timing of reaching the EOL has arrived, in response to determining that the redundant recording is disabled.

7. The storage device according to claim 1, wherein the processing circuitry is further configured to make a setting that allows to write data into the disk device in response to the storage device being connected through iSCSI (internet Small Computer System Interface), even when the setting that does not allow to write data is applied to one of the N disk devices.

8. The storage device according to claim 1, wherein the processing circuitry is further configured to make a setting that allows to write data into a system area, and does not allow to write data into areas other than the system area.

9. The storage device according to claim 1, wherein the processing circuitry is further configured to notify of the disk device for which the predetermined timing before the timing of reaching the EOL has arrived.

10. The storage device according to claim 1, wherein the processing circuitry is further configured to:

determine whether each of the N disk devices satisfies a predetermined condition; and check the timing of reaching the EOL for each of the N disk devices in response to determining that each of the N disk devices satisfies the predetermined condition.

11. The storage device according to claim 10, wherein the predetermined condition includes at least one of a condition for a model of a disk device, a condition for a manufacturer of a disk device, and a condition for a manufacturing lot of a disk device.

12. The storage device according to claim 1, wherein the processing circuitry is further configured to receive an instruction to read data and write data from a host device, in response to the storage device being connected to the host device through iSCSI (internet Small Computer System Interface).

13. The storage device according to claim 1, wherein the processing circuitry is further configured to prohibit writing data into the virtual disk, when it is determined that the redundant recording is disabled in the virtual disk and the plurality of disk devices include the disk device for which the predetermined timing before the timing of reaching the EOL has arrived.

14. A non-transitory computer-readable storage medium that stores therein a program for causing a computer to:

perform processing for configuring a virtual disk using a plurality of disk devices of N disk devices configured to record data redundantly, N being an integer of 2 or more, the N disk devices including NAND devices;

check a timing of reaching an EOL (End Of Life) for each of the N disk devices;

determine whether redundant recording is disabled in the virtual disk;

determine whether the plurality of disk devices include a disk device for which a predetermined timing before the timing of reaching the EOL has arrived; and allow writing data into the virtual disk, when it is determined that the redundant recording is not disabled in the virtual disk and the plurality of disk devices include the disk device for which the predetermined timing before the timing of reaching the EOL has arrived.

15. A method, comprising:

performing processing for configuring a virtual disk using a plurality of disk devices of N disk devices configured to record data redundantly, N being an integer of 2 or more, the N disk devices including NAND devices;

checking, using processing circuitry, a timing of reaching an EOL (End Of Life) for each of the N disk devices;

determining whether redundant recording is disabled in the virtual disk;

determining whether the plurality of disk devices include a disk device for which a predetermined timing before the timing of reaching the EOL has arrived; and allowing writing data into the virtual disk, when it is determined that the redundant recording is not disabled in the virtual disk and the plurality of disk devices include the disk device for which the predetermined timing before the timing of reaching the EOL has arrived.

* * * * *